United States Patent
Delbridge

(10) Patent No.: US 11,887,149 B1
(45) Date of Patent: Jan. 30, 2024

(54) DETERMINING WINNING ARMS OF A/B ELECTRONIC COMMUNICATION TESTING FOR A METRIC USING HISTORICAL DATA AND HISTOGRAM-BASED BAYESIAN INFERENCE

(71) Applicant: Klaviyo, Inc, Boston, MA (US)

(72) Inventor: Ian Delbridge, Boston, MA (US)

(73) Assignee: Klaviyo, Inc, Boston, MA (US)

( * ) Notice: Subject to any disclaimer, the term of this patent is extended or adjusted under 35 U.S.C. 154(b) by 0 days.

(21) Appl. No.: 18/201,644

(22) Filed: May 24, 2023

(51) Int. Cl.
  *G06Q 30/00* (2023.01)
  *G06Q 30/0242* (2023.01)
  *G06N 5/04* (2023.01)

(52) U.S. Cl.
  CPC .......... *G06Q 30/0243* (2013.01); *G06N 5/04* (2013.01)

(58) Field of Classification Search
  None
  See application file for complete search history.

(56) References Cited

U.S. PATENT DOCUMENTS

| | | | |
|---|---|---|---|
| 7,533,090 B2 | 5/2009 | Agarwal et al. | |
| 7,752,607 B2 | 7/2010 | Larab et al. | |
| 7,845,950 B2 | 12/2010 | Driscoll et al. | |
| 7,975,000 B2 * | 7/2011 | Dixon | H04L 67/01 715/962 |
| 10,503,912 B1 | 12/2019 | Kerr | |
| 11,769,171 B1 * | 9/2023 | Huang | G06Q 30/0251 705/14.45 |
| 11,783,643 B1 * | 10/2023 | Khiabani | G06N 5/022 701/32.1 |
| 2008/0189156 A1 * | 8/2008 | Voda | G06Q 10/067 705/7.33 |
| 2012/0191546 A1 | 7/2012 | Phelan et al. | |

(Continued)

FOREIGN PATENT DOCUMENTS

EP    4174577 A1 *  5/2023  ............. G03F 7/705

OTHER PUBLICATIONS

Kamalbasha, Shafi, et al. "Bayesian A/B Testing for Business Decisions." Data Science: Analytics and Applications, p. 50-57. Mar. 5, 2020. (Year: 2020).*

(Continued)

*Primary Examiner* — Luis A Brown
(74) *Attorney, Agent, or Firm* — Brian Short

(57) ABSTRACT

Apparatuses, methods, and systems for determining winning arms of electronic testing. One method includes obtaining historical data related to the testing, creating a histogram based on the historical data, the histogram including bins and weights, creating a distribution by computing concentration parameters of the distribution from the weights of the histogram, executing the testing, receiving new data collected based on the execution of the test, allocating the new data into same bins as the bins of the histogram of the historical data yielding a new data bin count, computing a posterior distribution comprising updating the distribution using the same bins and the new data bin counts and the concentration parameters of the distribution in closed form vie conjugate prior formulae, inferring corresponding central tendencies of samplings of a metric distribution, constructing an overall utility distribution for each arms of the test, and determining a winning arm of the testing.

20 Claims, 8 Drawing Sheets

(56) References Cited

U.S. PATENT DOCUMENTS

| | | | |
|---|---|---|---|
| 2014/0278747 A1 | 9/2014 | Gumm | |
| 2015/0227962 A1* | 8/2015 | Wical | G06Q 30/0243 |
| | | | 705/14.42 |
| 2016/0117717 A1* | 4/2016 | Moreau | G06Q 30/0245 |
| | | | 705/14.42 |
| 2016/0189176 A1 | 6/2016 | Newnham | |
| 2018/0082326 A1* | 3/2018 | Vlassis | G06Q 30/0242 |
| 2018/0341873 A1* | 11/2018 | Fellows | H04L 67/306 |
| 2019/0122254 A1* | 4/2019 | Duquette | G06Q 30/0243 |
| 2019/0311301 A1* | 10/2019 | Pyati | G06F 16/901 |
| 2020/0104340 A1* | 4/2020 | Liu | G06F 9/4812 |
| 2020/0327577 A1* | 10/2020 | Truong | G06Q 30/0244 |
| 2020/0357012 A1* | 11/2020 | Kendall | G06Q 20/3433 |
| 2020/0394455 A1* | 12/2020 | Lee | G06Q 40/08 |
| 2021/0109897 A1 | 4/2021 | Brechbuhl et al. | |
| 2022/0283932 A1* | 9/2022 | Arbour | G06F 16/958 |
| 2022/0414325 A1* | 12/2022 | Bhatnagar | G06F 40/14 |
| 2022/0414686 A1* | 12/2022 | Lawson | G06Q 30/0201 |
| 2023/0033753 A1* | 2/2023 | Wang | G06Q 30/0201 |
| 2023/0186342 A1* | 6/2023 | Ding | G06Q 30/0243 |
| | | | 705/14.42 |

OTHER PUBLICATIONS

Kobayashi, Takumi. "Dirichlet-Based Histogram Feature Transform for Image Classification." National Institute of Advanced Industrial Science and Technology, CVPR 2014. (Year: 2014).*

Frigui, Hichem, et al. "Unsupervised Clustering and Feature Weighting based on Generalized Dirichlet Mixture Modeling." Sience Direct: Information Sciences 274, pp. 35-54. Mar. 27, 2014. (Year: 2014).*

Miller, Alex, et al. "An Empirical Meta-analysis of E-Commerce A/B Testing Strategies." The Wharton School, University of Pennsylvania, 2020. (Year: 2020).*

Cali, Sedef, et al. "A Bayesian based Approach for Analyzing Customer's Online Sales Data to Identify Weights of Product Attributes." Expert Systems with Applications, vol. 210, Aug. 9, 2022. (Year: 2022).*

* cited by examiner

DETERMINING WINNING ARMS OF A/B ELECTRONIC COMMUNICATION TESTING FOR A METRIC USING HISTORICAL DATA AND HISTOGRAM-BASED BAYESIAN INFERENCE

FIELD OF THE DESCRIBED EMBODIMENTS

The described embodiments relate generally to intelligent electronic communication management. More particularly, the described embodiments relate to systems, methods, and apparatuses for determining winning arms of electronic testing for a metric using historical data and histogram-based Bayesian inference.

BACKGROUND

Typically, A/B testing systems of messages limit the number of metrics that can be used to determine which variation of the A/B test wins. The variations are limited to a subset of metrics that have been characterized manually, or users of the system are solicited for information, such as, an expected conversion rate, minimum detectable sample size, and/or desired power. When limiting the variation to a subset, the users may not be able to optimize messages for the metrics that matter the most. When soliciting information from the users, the users carry a large cognitive load and must answer questions they may not be able to answer. Moreover, non-binary metrics like revenue—in contrast with binary metrics like conversion rates—are especially difficult to model probabilistically, even when only modeling a single metric, much less specifying a model flexible enough to handle any metric.

It is desirable to have methods, apparatuses, and systems determining winning arms of electronic testing for a metric using historical data and histogram-based Bayesian inference.

SUMMARY

An embodiment includes a computer-implemented method for selecting a winner of an A/B test. The method includes obtaining historical data related to the A/B test, creating a histogram based on the historical data, the histogram including bins and weights, creating a Dirichlet distribution by computing concentration parameters of the Dirichlet distribution from the weights of the histogram, executing the A/B test with an associated metric of the A/B test with a user profile, receiving new data collected based on the execution of the A/B test and the associated metric, allocating the new data into same bins as the bins of the histogram of the historical data yielding a new data bin count for each bin of the allocated new data, computing a posterior Dirichlet distribution comprising updating the Dirichlet distribution using the same bins and the new data bin counts and the concentration parameters of the Dirichlet distribution in closed form vie conjugate prior formulae, inferring corresponding central tendencies of samplings of a metric distribution, wherein each central tendency of the corresponding central tendencies is determined by sampling the posterior Dirichlet distribution, constructing an overall utility distribution for each arms of the A/B test by combining the central tendency of each sampling of the metric distribution with a corresponding sampling of a conversion probability distribution, and determining a winning arm of the A/B testing by comparing the overall utility distribution of each arm with each other arm of the A/B test.

Another embodiment includes a system configured to select a winner of an A/B test. The system includes a plurality of computing devices, a merchant server, and a server connected to the merchant server and the computing devices through a network. The server is configured to obtain historical data related to the A/B test, create a histogram based on the historical data, the histogram including bins and weights, create a Dirichlet distribution by computing concentration parameters of the Dirichlet distribution from the weights of the histogram, execute the A/B test with an associated metric comprising testing at least two arms of the A/B test with a user profile, receive new data from the plurality of computing devices collected based on recipient actions during the execution of the A/B test and the associated metric, allocate the new data into same bins as the bins of the histogram of the historical data yielding a new data bin count for each bin of the allocated new data, compute a posterior Dirichlet distribution comprising updating the Dirichlet distribution using the same bins and the new data bin counts and the concentration parameters of the Dirichlet distribution in closed form vie conjugate prior formulae, infer corresponding central tendencies of samplings of a metric distribution, wherein each central tendency of the corresponding central tendencies is determined by sampling the posterior Dirichlet distribution, construct an overall utility distribution for each arms of the A/B test by combining the central tendency of each sampling of the metric distribution with a corresponding sampling of a conversion probability distribution, determine a winning arm of the A/B testing by comparing the overall utility distribution of each arm with each other arm of the A/B test, electronically communicate with recipients of the computing devices using a template based on the winning arm of the A/B testing.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for determining winning arms of electronic testing for a metric using historical data and histogram-based Bayesian inference. At least some of the described embodiments are integrated into the practical application of determining winning arms of A/B testing. At least some of the described embodiments for A/B testing include integrating the processes for improving the computing of winning arms of electronic testing of electronic communications on a computer or server. Accordingly, the operation of the computers or servers that are configured to execute at least some of the described processes for A/B testing are functionally improved. That is, the A/B testing is improved, and the computing of the A/B testing is improved. At least some embodiments improve the computational purpose by determining an approximate sample size needed for A/B testing arbitrary metrics without requiring user intervention. Further, the described embodiments accurately determine a probability of a variation of the A/B testing winning when using arbitrary numerical metrics. For at least some embodiments, any metric can be (accurately) used for the A/B testing. Further, for at least some embodiments, a user (operator of the A/B testing) does not need to be solicited for extra information. For at least some embodiments, statistical estimates of the A/B testing are more accurate than a one-size-fits-all solution. Further, at least some of the described embodiments for A/B testing (computational purpose) are faster than typical A/B testing solutions for arbitrary numerical metrics because posterior metric distributions are determined using fast operations (computing histograms and conjugate prior formula) compared to typical means (Markov chain Monte Carlo or approximate Bayesian inference). Arbitrary numerical metrics are numerical values that are used to measure or evaluate something, but which have no intrinsic or objective meaning. At least some of the described embodiments allow for unlimited metrics, and do not require user solicitation, because the described embodiments use a flexible distribution representation informed by historical data.

Figure 1:
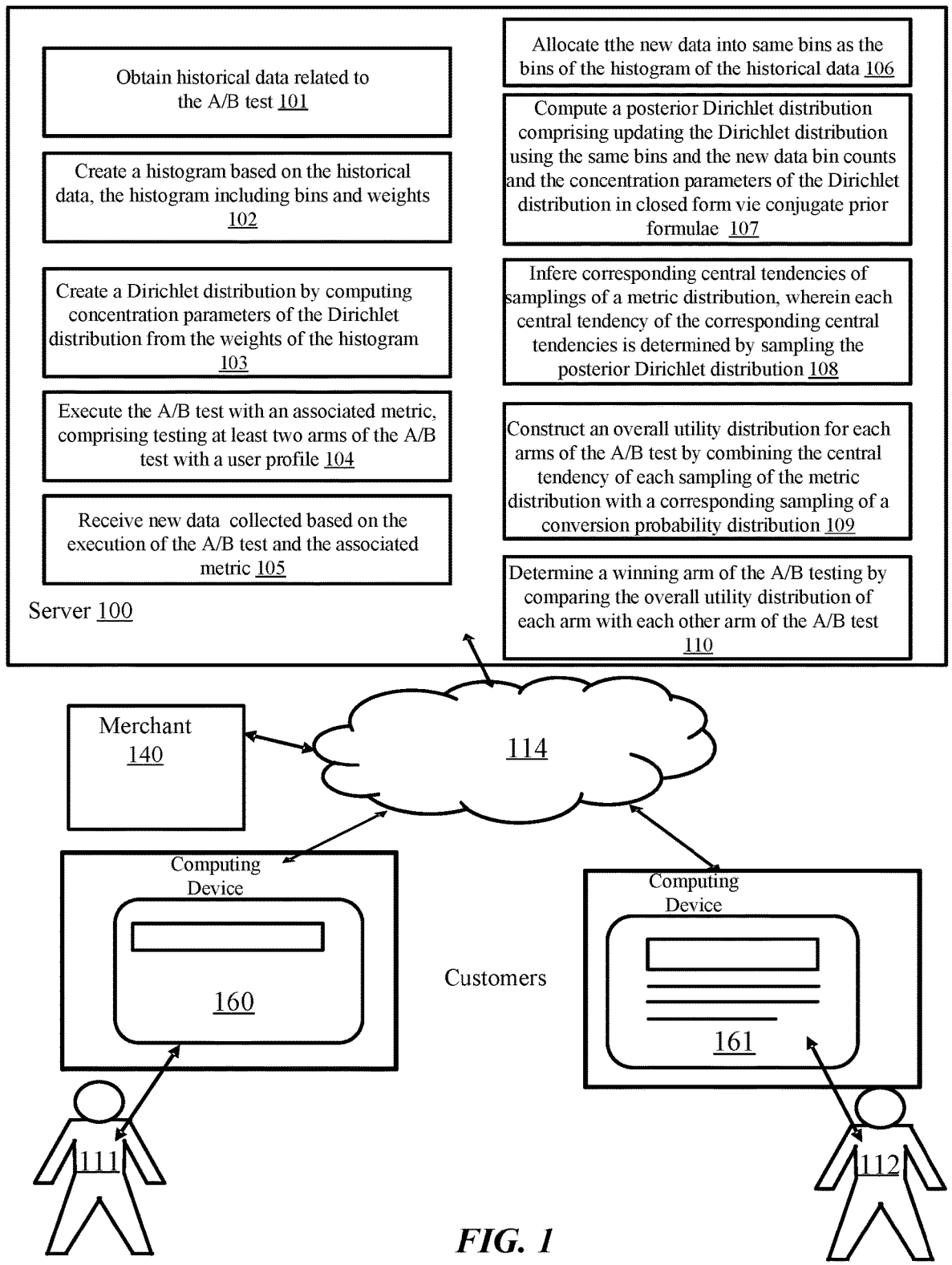
FIG. 1 shows a system for determining winning arms of electronic testing, according to an embodiment.

FIG. 1 shows a system for determining winning arms of electronic testing, according to an embodiment. As shown, a system server 100 is configured to select a winner of an A/B test. For an embodiment, the selection process includes obtaining 101 historical data related to the A/B testing. The historical data may include, for example, purchase order values from the last 6 months of customers (for example, users 111, 112) of a merchant that manages a merchant server 140. For an embodiment, computing devices 160, 161, and the merchant server 140 are connected through a network 114 to the server 100. For an embodiment, the historical data for a numerical metric (such as, purchase order values) and for an electronic message type (that is, for email, SMS (small messaging system) etc.) may be the set of purchase order values attributed to the electronic message (communication) sent. However, the historical data can include any data related to an action taken by a recipient (for example, a customer) due to the electronic communication to the recipient. The actions include sensed electronic action, or as will be described, other sensed physical and/or electronic actions performed by the recipient due the electronic communication to the recipient.

A/B Testing

A/B testing, also known as split testing, refers to a randomized experimentation process wherein two or more versions of a variable (forms, electronic messages, websites, web pages, page element, etc.) are shown to different segments of website visitors, recipients of electronic forms, or recipients of electronic messages at the same time to determine which version leaves the maximum impact and drives business metrics. Examples of forms of electronic messaging that may implement the A/B testing includes, for example, website content, email, mobile messaging, SMS (Short Message Service), WhatsApp®, WeChat®, Facebook Messenger®, and similar platforms that enable textual communication. Specific embodiments include, for example, variations (at least A and B) of templates that configure an electronic message, an electronic form, or a website.

After obtaining the historical data, for an embodiment, the system server 100 is further configured to create 102 a histogram based on the historical data. For an embodiment, the histogram includes bins and weights. Generally, a histogram displays numerical data by grouping data into "bins" of equal width. For an embodiment, each bin is plotted as a bar whose height corresponds to how many data points are in that bin. Bins are also sometimes called "intervals", "classes", or "buckets". A weighted histogram shows the weighted distribution of the data. If the histogram displays proportions (rather than raw counts), then the heights of the bars are the sum of the standardized weights of the observations within each bin. As an example, the numerical metric may be a purchase value attributed to a message. For an embodiment, the messaging type may be email. For an embodiment, the historical data for this numerical metric and for this messaging type (that is, for email) may be the set of purchase values attributed to email sent.

After creating the histogram of the historical data, for an embodiment, the system server 100 is further configured to create 103 a Dirichlet distribution by computing concentration parameters of the Dirichlet distribution from the weights of the histogram. For an embodiment, the concentration parameters are computed by multiplying the histogram weights by a scaling factor. For an embodiment, the scaling factor is a number that is selected to ensure that a desired level of uncertainty is achieved by the distribution. For an embodiment, there is a one-to-one relationship between the concentration parameters of the Dirichlet distribution and the histogram weights, so the distribution is specified by the scaled weights. For an embodiment, the concentration parameters of a distribution family are the numbers that define a specific distribution. For example, a Normal distribution has two parameters: the mean and standard deviation. In the case of the Dirichlet distribution, there are B number of parameters, wherein for the described embodiments, B is the number of bins.

A/B testing determination utilizing the Dirichlet distribution to model a metric density is very fast, For at least some embodiments, a Dirichlet distribution is preferable because (1) it appropriately represents uncertainty in the frequencies of non-overlapping categories or bins and (2) updating this uncertainty using observed frequencies is fast and simple. Usage of a Dirichlet distribution in tandem with a histogram to represent numerical metric probability densities is novel and non-obvious because other solutions use parametric densities (such as Gaussian or Gamma distributions) or other non-parametric distributions (such as Dirichlet process mixture distributions).

Though 103 includes the creation of a Dirichlet distribution by computing concentration parameters of the Dirichlet distribution from the weights of the histogram, it is to be understood that at least some embodiments include creation of other types of distributions. That is, other embodiments may include a distribution other than a Dirichlet distribution. With or without using a Dirichlet distribution specifically, the uniqueness of the described embodiments is in the combination of the methods and the application. Specifically, the described embodiments include the creation of a density model (model of metric values). For example, a model of what purchase values occur and how often and a frequency model (distribution of a (conversion) probability) of the metrics previously tracked through the historical data and being applied to electronic A/B testing. While referred to as a "frequency model" this model may be more generally referred to as a "model of the probability of recipients taking action".

At least some embodiments include the use of the Dirichlet distribution to model the metric density, and the use of the conjugate prior formulae. These embodiments are very fast since applying the conjugate prior formulae is fast. Accordingly, A/B testing determination utilizing the Dirichlet distribution to model the metric density is very fast. It is common practice in applied statistics to represent densities with a parametric distribution, such as a Gamma distribution. However, these are slow to update and are inflexible, so the resulting density models are inaccurate. It is to be understood that Gamma distributions are not comparable to Dirichlet distributions. While they are both probability distributions, the Gamma distribution directly represents a numerical distribution whereas the Dirichlet distribution represents uncertainty over the frequencies of non-overlapping categories and for the described embodiment is combined with numerical value indicators (such as the center of histogram bins) to represent numerical distributions.

Dirichlet Distribution

In probability and statistics, the Dirichlet distribution is a family of continuous multivariate probability distributions parameterized by a vector of positive reals. It is a multivariate generalization of the beta distribution, hence its alternative name of multivariate beta distribution (MBD). Dirichlet distributions are commonly used as prior distributions in Bayesian statistics, and in fact, the Dirichlet distribution is the conjugate prior of the categorical distribution and multinomial distribution.

For an embodiment, the A/B test with an associated metric is executed 104. The associated metric can include, for example, submit rate of a form, or some customer action to be sensed based on the customer being subjected to each of the arms. For an embodiment, the A/B test includes testing at least two arms (test variations, such as, template variations, form variations, etc.) of the A/B test. For an embodiment, the A/B testing further includes a user profile, which may include, for example, message recipients.

For an embodiment, the A/B test includes testing of at least one of websites, forms, templates of emails, or templates of mobile messages. As previously described, examples of forms of electronic messaging that may implement the A/B testing includes, for example, SMS (Short Message Service), WhatsApp®, WeChat®, Facebook Messenger®, and similar platforms that enable textual communication.

After execution of the A/B test, for at least some embodiments, the server 100 is further configured to receive 105 new data collected based on the execution of the A/B test and the associated metric. Exemplary metrics include a purchase value (for ecommerce), time spent on an application (for software), and/or test scores (for education). For an embodiment, collecting new data includes sensing customer actions associated with the metric for at least two arms of the A/B test. As will be described, the sensed customer actions can include any action performed by the customer (recipient) due to the customer (recipient) having received the electronic communication of the A/B test. The sensed customer actions can include sensing physical actions of the customer, such as, actions sensed by electronic sensor(s) located on a computing device of the customer (recipient). Such sensors (global positioning systems, accelerometers, gyroscopes, accelerometers, etc.) can sense physical motion of the customer (recipient) resulting to the customer (recipient) having received the electronic communication. The sensed physical motion can be used to detect a customer visiting a physical location of a merchant and actions of the customer within the physical location of the merchant, such as, physically touching, holding, or moving a product of the merchant at the location of the merchant. For at least some embodiments, the sensed customer actions are digital actions, such as, navigating to a website, spending time or money on an application. For at least some embodiments, the sensed customer actions include a combination of both physical motions/actions by the electronic message recipient (customer) and digital actions by the electronic message recipient (customer).

As described, the A/B testing can include the testing of electronic communications from a merchant to customers of the merchant. For an embodiment, the different arms of the testing are variations of one of different types of the electronic communication, and the measured results (new data) of the testing includes actions of the recipients of the electronic communications testing as a result of having received the different arms of the electronic communications testing. As previously described, the different electronic communications may include forms, mobile messages, and/or electronic messages. The A/B testing may include variations of templates of forms, variations of templates of mobile messages, and/or variations of templates of electronic messages.

Templates of Forms

For an embodiment, the A/B testing includes N variations (arms) of templates that define forms. That is, the electronic communication to the customer (recipient) includes an electronic form. For an embodiment, each of N templates includes a set of data objects that combine to represent a structure of a form. For an embodiment, the first and second templates of the N templates of the form each have a different content or behavior. Accordingly, the set of data objects of each of the first and second templates combine to represent a structure of forms having a different content and/or behavior. The structure of a form includes the content and the behavior. For an embodiment, the templates additional include information pertaining to testing of the form(s). The additional information can include, for example, a test name, a description of test (makes it easier to remember what is being tested), an ending date, and/or specific settings that correspond to statistical significance criteria. For an embodiment, the additional information pertaining to the testing combined with the data for the templates define a test.

For an embodiment, the server 100 operates to assign a respective group of site visitors (which then may become recipients) to the first template of the form and the second template of the form, wherein the assigning is random. For an embodiment, the site visitors are obtained by tracking information of visitors to the customer website managed by the merchant server 140. For an embodiment, the site visitors include recent site visitors. For an embodiment, recent site visitors include site visitors that have visited the customer website within a predetermined time-period. For an embodiment, recent site visitors include a selected number of most recent site visitors. For an embodiment, recent site visitors) include site visitors who are qualified to view since a testing of templates has begun. For an embodiment, recent site visitors include site visitors since a specific event. For an embodiment, the specific event may include, for example, a large change in the settings of a template test.

For an embodiment, the server 100 further operates to determine automatically whether the first template of the form is statistically more advantageous than the second template of the form. For an embodiment, the server 100 operating to determine the statistical advantage includes using the A/B testing of the described embodiments, wherein the first template is a first arm of the testing and the second template is a second arm of the testing. Generally, a form with a statistical advantage is better at soliciting a desired response from a website visitor that is displayed the form.

Figure 2:
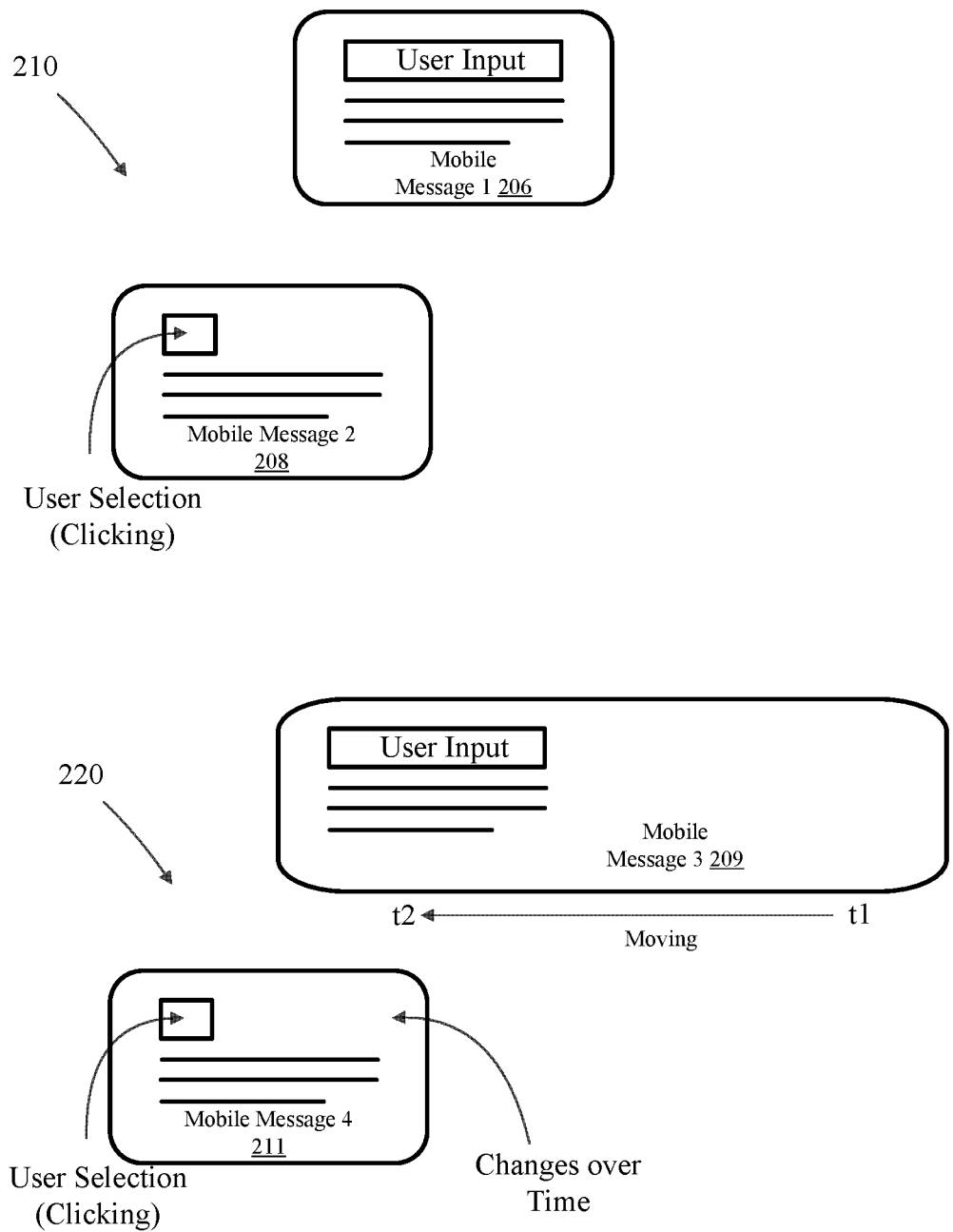
FIG. 2 shows templates of a mobile message, an electronic message, or a form, wherein each temple includes different content or behavior, according to an embodiment.

FIG. 2 shows templates of a mobile message, an electronic message, or a form, wherein each temple includes different content, behavior or send time, according to an embodiment. A first website display 210 includes a form, mobile message, or electronic message 206 that requires an input from a user (site visitor), and a form 208 that requires a user input through, for example, a selection, such as, through a mouse click. A second website display 220 includes a form 209 that changes positions on the display between times t1 and t2, and a form 211 that "pops up" a time t3 after the webpage has been loaded. Clearly, other forms having different content and behavior can be utilized. As shown, for an embodiment, the different templates operate to control a display of the form(s) on a display of a computing device (such as, computing devices 160, 161) of users (such as, customers (recipients) 111, 112). As stated, for an embodiment, the different forms provide the electronic communications of the A/B testing.

For an embodiment, the form includes a file configured to receive an input from a site visitor. For an embodiment, the required input includes at least one or more of the customer (site visitor) clicking to a different page, or the customer entering information. For an embodiment, the form is distinct from an underlying website which may include a dynamic and interactive page. For an embodiment, the forms of the templates are distinct from the underlying website because the forms appear visually and/or behaviorally distinct from the underlying page. For example, the behavior of the form may include the form popping up after the page is loaded or sliding out from the side after the rest of the page has been loaded. As previously described, the different templates of the A/B test control the behavior of the form, and accordingly, control the display of a recipient of the form.

Templates of Mobile Messages

For an embodiment, the A/B testing includes N variations (arms) of templates the define mobile messages. For an embodiment, each of N templates includes a set of data objects that combine to represent a structure of a mobile message. As described, the first and second templates of the N templates of the mobile message each have a different content, a different send time, and/or a different behavior.

The different displays of the mobile message can include a changing display, such as, movement or varying display intensity. Accordingly, the set of data objects of each of the first and second templates combine to represent a structure of mobile message having a different content, different send times, or different behavior of the mobile messages. For an embodiment, the structure of the mobile message includes the content, the send time, or the behavior control. For an embodiment, the templates additional include information pertaining to testing of the mobile message(s). The additional information can include, for example, a test name, a description of test (makes it easier to remember what is being tested), an ending date, and/or specific settings that correspond to statistical significance criteria. For an embodiment, the additional information pertaining to the testing combined with the data for the templates define a test.

For an embodiment, the messages 206, 208, 209, 211 may be mobile messages. For an embodiment, the mobile messages require an input. A first display of a mobile device of a mobile message recipient includes a mobile message 206 that requires an input from a user (mobile message recipient) and a mobile message 208 that requires a user input through, for example, a selection, such as, through a click. A second display includes a mobile message 209 that changes on the display between times t1 and t2, and a mobile message 211 that is delivered a time t3 after the mobile message has been sent. Clearly, other mobile messages having different content, send times, and behavior can be utilized. For an embodiment, templates that have different send times are sent to the mobile message recipients at different times. For an embodiment, a different send time of the first template and the second template include a first send time for the first template and a second send time of the second template. For an embodiment, messages received at different times during the day may be more or less likely to achieve success, based on trends observed in both mobile messages and email. That is mobile message recipient behavior can be observed by prior mobile messages to the mobile message recipient, or other types of electronic mail sent to the mobile message recipient. Based on the observer prior behavior of the mobile message recipient, the first and second send times can be selected. Further, there can be legal restrictions on send times, which influence the times the server selects for the first and second send times.

For an embodiment, the mobile message includes a file configured to receive an input from a mobile message recipient. For an embodiment, the required input includes at least one or more of the customers (site visitor) clicking to a different page, or the customer entering information. However, as previously mentioned, sensors of mobile devices of the mobile message recipients can be utilized to determine or detect actions of the mobile message recipients that indicate changes in behavior of the mobile message recipient due to receiving the mobile messages of the different templates.

An embodiment includes counting the successes of the mobile message sent to mobile message recipients of, for example, a group 1 and a group 2 according to a template 1 and a template 2. As previously described, for an embodiment, successes of the mobile messages generally include determining how many of the mobile message recipients of the mobile messages are tracked or determined to have performed a task of the mobile message. For an embodiment, the tracked and monitored activities of the mobile message recipients are online activities. For an embodiment, mobile devices of the mobile message recipients are tracked, and the tracked and monitored activities include locations and motions of the mobile message recipients.

For an embodiment, the mobile message recipients are obtained by tracking information of mobile message recipients to the customer website managed by a marketing manager of the merchant server 140. For an embodiment, the mobile message recipients include recent mobile message recipients. For an embodiment, recent mobile message recipients include site mobile message recipients that have visited the customer website within a predetermined time-period. For an embodiment, mobile message recipients include a selected number of most recent customer website visitors. For an embodiment, recent site visitors include mobile message recipients since a specific event. For an embodiment, the specific event may include, for example, a large change in the settings of a template test. For an embodiment, the assigning is random with equal probabilistic distributions within each geographical region that the test is sent to. For example, the mobile message may be sent to mobile message recipients from N different geographical regions. For an embodiment, an equal number (or near equal) of mobile messages is sent to each of the geographical regions, but randomly sent to the mobile message recipients within each of the regions. For an embodiment, the assigning is deterministic but equally distributed within each of the geographical regions. For example, a first template 1 can be assigned to a first member of the list of planned mobile message recipients, a second template 2 can be assigned to a second member of the list of planned mobile message recipients, and the first template can be assigned to a third member of the list of planned mobile message recipients, and so on.

For at least some embodiments, an eligibility of the mobile message recipient is determined dynamically by a combination of a geolocation of the mobile message recipient, transactional (for example, purchase confirmation, delivery confirmation) vs. marketing purpose of the mobile message, and recency of the last marketing mobile or email message received. For example, only mobile message recipients who have not received a marketing email and/or marketing mobile message within the past 24 hours (or some other predetermined or adaptive time period X) are eligible to receive this message. For an embodiment, the planned mobile message recipients are determined when a mobile message is scheduled for transmission to the mobile message recipients. For an embodiment, when the mobile message is sent, the time that each planned mobile message recipient received their most recent marketing mobile message is determined, and only those mobile message recipients that have not received a marketing mobile message in the past X hours are deemed eligible mobile message recipients.

For an embodiment, content in the template(s) is dynamically updated based on actions or characteristics of the user. For example, different images or content of mobile messages of the templates are sent to the mobile message recipients based on the last product that a mobile message recipient browsed. Further, the mobile devices of the mobile message recipients can be tracked and monitored. For an embodiment, the content of the templates is additionally updated by physical location and activities of the mobile message recipients. The physical location and the activities can be sensed and/or identified based on locations and motion sensed by sensor of the mobile devices of the mobile message recipients.

For an embodiment, at least one of the plurality of mobile devices includes a location sensor and one or more motion sensors, and wherein the at least one of the plurality of mobile devices tracks locations and motions of a user of the at least one of the plurality of mobile devices, and the locations and motions of the user are included in the collected test data from the testing including the mobile message recipient actions of the first template of the mobile message and the second template of the mobile message.

Templates of Electronic Messages

For an embodiment, the A/B testing includes N variations (arms) of templates the define electronic messages. For an embodiment, each of N templates includes a set of data objects that combine to represent a structure of an electronic message. As described, the first and second templates of the N templates of the electronic message each have a different content. Accordingly, the set of data objects of each of the first and second templates combine to represent a structure of electronic messages having a different content. The structure of an electronic message includes the content. For an embodiment, the first and second templates determine content and of electronic messages to be tested. The testing of the template defined message includes additional information pertaining to the testing of the electronic message(s). The additional information can include, for example, a test name, a description of a test (makes it easier to remember what is being tested), an ending date, and/or specific settings that correspond to statistical significance criteria. For an embodiment, the additional information pertaining to the testing combined with the data for the templates define a test.

For an embodiment, the server 100 operates to continuously send a main electronic message, wherein at least a content of the main electronic message is determined by a main message template. That is, a previously selected template is designated as the main template that defines the main electronic message being sent to, for example, computing devices 160, 161.

For an embodiment, the server 100 operates to create a plurality of test templates including at least an A template and a B template. Once created, for an embodiment, the server 100 further operates to initiate testing of test electronic messages, wherein at least a content of one test electronic message is determined by the A template, and at least the content of another of the test electronic message is determined by the B template.

For an embodiment, the messages 206, 208, 209, 211 may more generally be electronic messages. FIG. 2 shows a system for testing of templates of electronic messages that includes switching 221 to electronic messages of winning templates, according to an embodiment. That is, for an embodiment, the server 100 is further configured to switch between the sending of the main message and the sending of the test messages, wherein no customer of the merchant receives both the main message and any one of the test messages (mutual exclusivity) and all customers receive at least one of the main message or one of the test messages.

Other Electronic Communications

For an embodiment, the messages 206, 208, 209, 211 are push notifications. For an embodiment, the push notifications are notifications from applications on (usually) loaded on mobile devices. For example, a restaurant chain may include push notifications from their application that is loadable to a mobile device of a use (recipient) that notifies users of special offers.

For an embodiment, the messages 206, 208, 209, 211 are websites or configurations of subcomponents on a website. For example, ecommerce merchant may A/B test the layout of a landing page (this is the tested "template" or "arm") to optimize purchases or website engagement.

Sensed Customer Actions

For an embodiment, successes include the electronic communication recipient(s) carrying out a main action that an electronic communication is intended to elicit, such as, for example, clicking a link in the electronic message (potentially embedded in an image), or making a purchase on the website linked to in the electronic message. It is to be understood, however, that successes need not be "desired" actions, since the goal of A/B testing may be in fact to find the variation/template/arm that minimizes or maximizes some action. For example, if the sensed action is a message recipient smoking an ecigarette, then the goal of A/B testing may be to prevent that action. At least some embodiments include electronically sensing whether the electronic message recipient has performed the main action (such as, making a purchase based on reception of the electronic message). Further, electronic message recipients may receive the electronic messages via mobile device, such as, a cellular phone. Accordingly, physical actions of the electronic message recipients can be tracked to determine whether the electronic message recipient(s) carried out a main action that the electronic message is intended to elicit. That is, sensors, such as, location sensors, such as, GPS (global positioning system) sensors, and/or motion sensors (such as, accelerometers, gyroscopes, and/or magnetic sensors) can be used to track the locations and actions of the electronic message recipient(s) to determine whether the electronic message recipient(s) performed the main action (such as, purchasing a product of the merchant) or another action. Selected sequences of actions by the recipient can be used to determine whether the received electronic communication caused an action by the recipient.

After execution of the A/B test and collection of new data generated by the A/B testing, for an embodiment, the system server 100 is further configured to allocate 106 the new data into same bins as the bins of the histogram of the historical data. For example, if exemplary bins of the historical data were bin 1 (0-10), bin 2 (10-20), and bin 3 (20-30), then new data 3, 22, and 8, would be allocated to bins 1, 3, and 1 respectively. For an embodiment, allocating the new data into same bins as the bins of the histogram of the historical data yields a new data bin count for each bin of the allocated new data. It is to be realized that for an embodiment, the bins of the allocated new data are the same as the bins of the historical data histogram.

After allocating the new data into same bins as the bins of the historical data, for an embodiment, the system server 100 is further configured to compute 107 a posterior Dirichlet distribution comprising updating the Dirichlet distribution using the same bins and the new data bin counts and the concentration parameters of the Dirichlet distribution in closed form vie conjugate prior formulae. For an embodiment, the conjugate prior formula is specifically a Dirichlet-Multinomial conjugate prior formula. Generally, a posterior distribution is a probability distribution that summarizes information about a random variable or parameter after obtaining new information from empirical data. An alternate embodiment includes taking the new weights, or, adding the new weights multiplied by some discount factor. Another alternate embodiment includes the distribution being updated by doing N rounds of optimization to maximize the likelihood of the observed data.

Conjugate Prior Formulae

A conjugate prior is an algebraic convenience, giving a closed-form expression for the posterior; otherwise, numerical integration may be necessary. Further, conjugate priors may give intuition by more transparently showing how a likelihood function updates a prior distribution.

After computing the posterior Dirichlet distribution, for an embodiment, the system server 100 is further configured to infer 108 corresponding central tendencies of samplings of a metric distribution, wherein each central tendency of the corresponding central tendencies is determined by sampling the posterior Dirichlet distribution. For an embodiment, the central tendencies include averages. For an embodiment, the metric distribution includes purchase values. Accordingly, the central tendency of the samplings of the metric distribution could be the average purchase value among those (recipients or customers) that purchase. For an embodiment, the sampling includes a set of frequencies that refer to a likelihood of observing corresponding histogram bins. For an embodiment, each time the Dirichlet distribution is sampled, a set of bar heights for that histogram are generated, wherein the bar height represents a frequency of getting the bin of the bar. For the description here, "frequency" is a synonym for "probability" or "likelihood". For example, inferring the central tendency of a sampling ([0.3, 0.6, 0.1]) for histogram bins (0-10, 10-20, 20-30) could be performed by summing the sampling values (weights) times the corresponding bin midpoints (0.3*5+0.6*15+0.1*25)).

For an embodiment, inferring the central tendency of the posterior metric distribution of the posterior Dirichlet distribution includes sampling the posterior Dirichlet distribution to create values for each bin, and computing a sample mean for each bin comprising summing a center point of endpoints of each bin multiplied by a corresponding created value of the bin. For an embodiment, the sampling of the posterior Dirichlet distribution to create values for each bin provides a prediction of how frequently the bin would occur in an actual distribution of the new data.

After inferring the central tendency for each sampling of the posterior metric distribution of the posterior Dirichlet distribution, for an embodiment, the system server 100 is further configured to construct 109 an overall utility distribution for each arms of the A/B test by combining the central tendency of each sampling of the metric distribution with a corresponding sampling of a conversion probability distribution, and determine 110 a winning arm of the A/B testing by comparing the overall utility distribution of each arm with each other arm of the A/B test. For an embodiment, the overall utility distribution includes an average purchase value per recipient or customer. For an embodiment, the conversion probability is a probability of a message recipient performing some action. For an embodiment, the conversion probability is selected based on the historical frequency of message recipients performing the action.

Arms

For an embodiment, a multi-arm experiment also known as multi-group A/B/n testing includes simultaneously testing more than one variation. For an embodiment, multi-arm testing involves two or more test groups (that is, A and B), and a control group (that is. C). This allows comparing A against C at the same time as B against C, thus reusing the control group. This also affords a head-to-head comparison between the test groups (A vs B) to evaluate differences or identify a clear statistical winner. This provides a powerful experimental tool that can reduce sample size, costs, and time, while testing multiple hypotheses in parallel.

For an embodiment, the winning arm is selected as a user default. That is, for example, the winning arm is used as the default for whatever electronic form, electronic messaging, or electronic communication is being used to interact with a customer or user. For example, for the electronic forms, emails, messages or website that is being tested, the winning arm is used for the electronic form, email, message or website being communicated, for example, to one or more customers.

For an embodiment, selecting weighting of distributions of customers that are recipients of each of the arms is selected based on the overall utility distribution for each of the arms of the A/B test. That is, during the A/B testing percentages of possible recipients of the A/B testing are allocated as recipients of the "A" test and recipients of the "B" test. For an embodiment, the percentages of the allocations are adjusted based on the overall utility distribution. As an example: utility distributions may be collectively sampled to estimate the fraction of the time one arm would win. This fraction may be used as the allocation percentage for this arm. This is referred to as Thompson sampling.

An embodiment includes ending the A/B test and selecting a winning arm based on the overall utility distribution for each of the arms of the A/B test. That is, based on the overall utility distribution for each of the arms of the A/B test, a statistical "winner" of the A/B testing can be identified.

Figure 3:
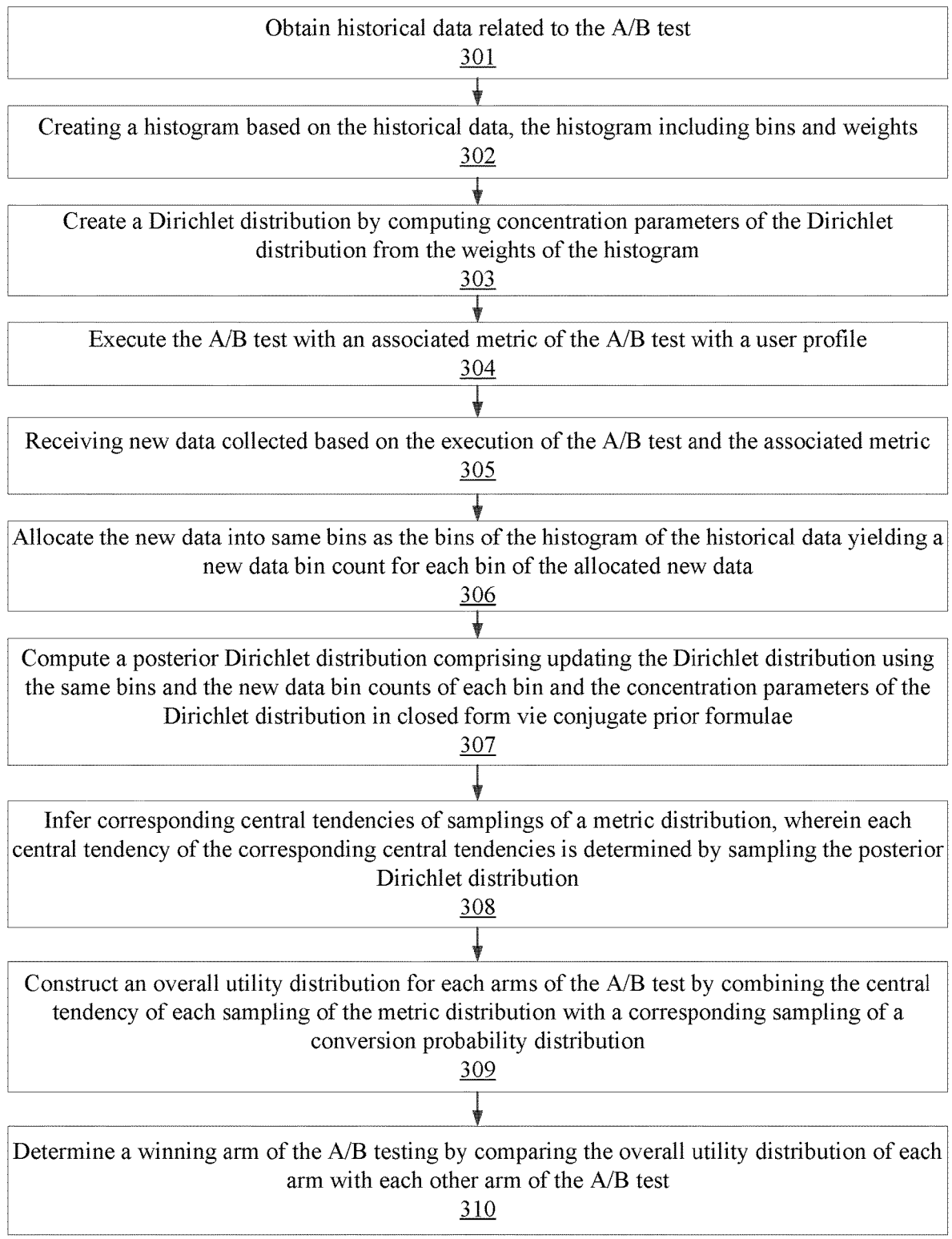
FIG. 3 is a flow chart that includes steps of a method for selecting a winner of an A/B test, according to an embodiment.

FIG. 3 is a flow chart that includes steps of a method for selecting a winner of an A/B test, according to an embodiment. A first step 301 includes obtaining historical data related to the A/B test. A second step 302 includes creating a histogram based on the historical data, the histogram including bins and weights. A third step 303 includes creating a Dirichlet distribution by computing concentration parameters of the Dirichlet distribution from the weights of the histogram. A fourth step 304 includes executing the A/B test with an associated metric of the A/B test with a user profile. For an embodiment, the user profile includes electronic message recipients. A fifth step 305 includes receiving new data (customer actions) collected based on the execution of the A/B test and the associated metric. A sixth step 306 includes allocating the new data into same bins as the bins of the histogram of the historical data yielding a new data bin count for each bin of the allocated new data. A seventh step 307 includes computing a posterior Dirichlet distribution comprising updating the Dirichlet distribution using the same bins and the new data bin counts and the concentration parameters of the Dirichlet distribution in closed form vie conjugate prior formulae. An eighth step 308 includes inferring corresponding central tendencies of samplings of a metric distribution, wherein each central tendency of the corresponding central tendencies is determined by sampling the posterior Dirichlet distribution. A ninth step 309 includes constructing an overall utility distribution for each arms of the A/B test by combining the central tendency of each sampling of the metric distribution with a corresponding sampling of a conversion probability distribution. A tenth step 310 includes determining a winning arm of the A/B testing by comparing the overall utility distribution of each arm with each other arm of the A/B test.

Concentration Parameters

As previously described, for an embodiment, the concentration parameters are computed by multiplying the histogram weights by a scaling factor. For an embodiment, the scaling factor is a number that is selected to ensure that a desired level of uncertainty is achieved by the distribution. For an embodiment, there is a one-to-one relationship between the concentration parameters of the Dirichlet distribution and the histogram weights, so the distribution is entirely specified by the scaled weights. For an embodiment, the parameters of a distribution family are the numbers that define a specific distribution. For example, a Normal distribution has two parameters: the mean and standard deviation. In the case of the Dirichlet distribution, there B number of parameters, wherein for the described embodiments, B is the number of bins.

As previously described, for an embodiment, the bins of the allocated new data are the same as the bins of the historical data histogram.

For an embodiment, the inferred corresponding tendencies include an average of the samplings of the metric distribution. For an embodiment, the metric distribution includes a distribution of purchase values. For an embodiment, the central tendency of the samplings of the metric distribution is the average purchase value among those that make a purchase. For an embodiment, each time the Dirichlet distribution is sampled, a set of bar heights for the histogram are generated-recalling that a bar height represents the frequency of getting the bin of the bar, wherein the frequency is synonymous with a probability or a likelihood.

For an embodiment, constructing an overall utility distribution includes determining an average purchase value per recipient. For an embodiment, the conversion probability is the probability of a message recipient performing some action which is based on the historical frequency of message recipients performing the action.

For an embodiment, the winning arm of the A/B testing is the arm that most frequently has the highest sampled utility when sampling the utility distribution of each arm.

As previously stated, though 103 includes the creation of a Dirichlet distribution from the weights of the histogram, it is to be understood that at least some embodiments include creation of other types of distributions. With or without using a Dirichlet distribution specifically, the uniqueness of the described embodiments is in the combination of the methods and the application. Specifically, the described embodiments include the creation of a density model and a frequency model (distribution of a (conversion) probability) of the metrics previously tracked through the historical data, and the application being electronic A/B testing.

However, at least some embodiments include the use of the Dirichlet distribution to model the metric density, and the use of the conjugate prior formulae. These embodiments are very fast. For example, the use of the conjugate prior formulae can reduce processing to milliseconds versus a few seconds for an MCMC (Markov Chain Monte Carlo) or variational inference. To further elaborate, it is common practice in applied statistics to represent densities with a parametric distribution, such as a Gamma distribution. However, these are slow to update and are inflexible, so the resulting density models are inaccurate.

As previously described, for an embodiment, the testing and communicating with testing recipients includes variations (arms) based on variation of templates. Further, for an embodiment, the winning arm (template) is used for future electronic communication with the recipients after the A/B testing.

For an embodiment, the winning arm is an arm that most frequently has a highest sampled utility when sampling the overall utility distribution of the arm. As previously described, for an embodiment, the A/B test includes testing of at least one of websites, a form, templates of emails, or templates of mobile messages. (SMS/MMS and Push notifications), wherein a first template defines an A version of the template, and a second template defines a B version of the template. As previously described, for an embodiment, each arm of the A/B testing includes a template of at least one of a form, an email, or a mobile message, including an A template and a B template, wherein each template includes a set of data objects that combine to represent a structure of the form, the email, or the mobile message, wherein the A template and the B template of the form, the email, or the mobile message each have a different content, behavior, or send time. As previously described, for an embodiment, the different behavior includes the form, the email, or the mobile message popping up being loaded or sliding out from a side of a display of a recipient after being loaded. As previously described, an embodiment includes further comprising selecting the winning arm as a user default, wherein the selected user default is used for electronic communications with recipients.

An embodiment includes further selecting weighting of distribution of customers receiving each of the arms based on the overall utility distribution for each of the arms of the A/B test. For an embodiment, the weighting of distribution of each arm is based on how frequently the arm has the highest sampled utility.

As previously described, for at least some embodiments, the associated metric includes at least one of a purchase value, a quantity of items purchased, a number of times software users open an application, an amount of time users spend in an application, etc.

An embodiment includes ending the A/B test based on the overall utility distribution for each of the arms of the A/B test. For example, one arm may be clearly established as the winner, and therefore, the testing may end. For an embodiment, the A/B testing is ended when the overall utility distribution of one arm is a threshold better than each of other arms.

For an embodiment, inferring the central tendency of the posterior metric distribution of the posterior Dirichlet distribution includes sampling the posterior Dirichlet distribution to create values for each bin, and computing a sample mean for each bin comprising summing a center point of endpoints of each bin multiplied by a corresponding created value of the bin.

For an embodiment, the sampling of the posterior Dirichlet distribution to create values for each bin provides a prediction of how frequently the bin occurs in an actual distribution of the new data.

For an embodiment, receiving the new data collected based on the execution of the A/B test and the associated metric includes sensing actions of recipients of electronic communications of the A/B test. For an embodiment, sensing actions of the recipients includes sensing physical motion of the recipients including sensing keyboards actions of the recipients, sensing physical motion of the recipients, and tracking locations of the recipients. As previously described, for at least some embodiments, the A/B testing includes testing of at least one of websites, form, templates of emails, or templates of mobile messages, SMS (Short Message Service), WhatsApp®, WeChat®, Facebook Messenger®, and similar platforms that enable textual communication.

As previously described, for an embodiment, the winning arm is selected as a user default. That is, for example, the winning arm is used as the default for whatever electronic form, electronic messaging, or electronic communication is being used to interact with a customer or user. For example, for the electronic form, email, message or website that is being tested, the winning arm is used for the electronic form, email, message or website being communicated, for example, to customers.

As previously described, for an embodiment, selecting weighting of distributions of customers that are recipients of each of the arms is selected based on the overall utility distribution for each of the arms of the A/B test. That is, during the A/B testing percentages of possible recipients of the A/B testing are allocated as recipients of the "A" test and recipients of the "B" test. For an embodiment, the percentages of the allocations are adjusted based on the overall utility distribution.

As previously described, for an embodiment, ending the A/B test a selecting a winning arm based on the overall utility distribution for each of the arms of the A/B test. That is, based on the overall utility distribution for each of the arms of the A/B test, a statistical "winner" of the A/B testing can be identified.

For an embodiment, inferring the central tendency of the posterior metric distribution of the posterior Dirichlet distribution includes sampling the posterior Dirichlet distribution to create values for each bin, and computing a sample mean for each bin comprising summing a center point of endpoints of each bin multiplied by a corresponding created value of the bin, wherein the sampling of the posterior Dirichlet distribution to create values for each bin provides a prediction of how frequently the bin would occur in an actual distribution of the new data.

For an embodiment, receiving the new data collected based on the execution of the A/B test and the associated metric includes sensing actions of recipients of electronic communications of the A/B test. For an embodiment, sensing actions of the recipients includes sensing physical motion of the recipients including sensing keyboards actions of the recipients, sensing physical motion of the recipients, and tracking locations of the recipients. For an embodiment, obtaining historical data related to the A/B test includes sensing of past actions of recipients related to the A/B test, wherein receiving new data collected based on the execution of the A/B test and the associated metric comprises sensing actions of recipients electronically receiving electronic communications of the A/B test, and further comprising influencing future electronic communications with recipients based on the winning arm of the A/B test.

For an embodiment, sensing actions of the recipients includes sensing, by sensors of computing devices of the recipients, changes in physical location and motion of the recipient that are correlated with receiving the electronic communications, and wherein influencing future electronic communications with the recipient includes selecting the winning template associated with the winning arm of the A/B test, wherein the winning template is used for future electronic communications with the recipients. For an embodiment, the sensors of the computing devices include one or more of a GPS (global positioning system) sensor, a magnetic sensor, an accelerometer, and/or a gyroscope. The sensors operate to sense physical location and motion of user (customers) associated with the computing devices. Accordingly, actions (motions and location) of the users can be correlated with the user (customers) receiving the electronic communications. Therefore, changes in location and motion can be correlated with electronic communications. Further patterns or sequences of changes in location and motion of the user (customers) can be correlated with the electronic communications. The correlation indicates an action by the recipient of the electronic communications based on reception of the electronic communication. Further, for an embodiment, combinations of sensed electronic actions (such as, accessing websites, performing an electronic purchase, etc.) and sensed motion/location actions can be monitored. Each of these sense actions or combinations of actions can be used to indicate a sensed action by the user (customers) based on having received the electronic communication.

Figure 4:
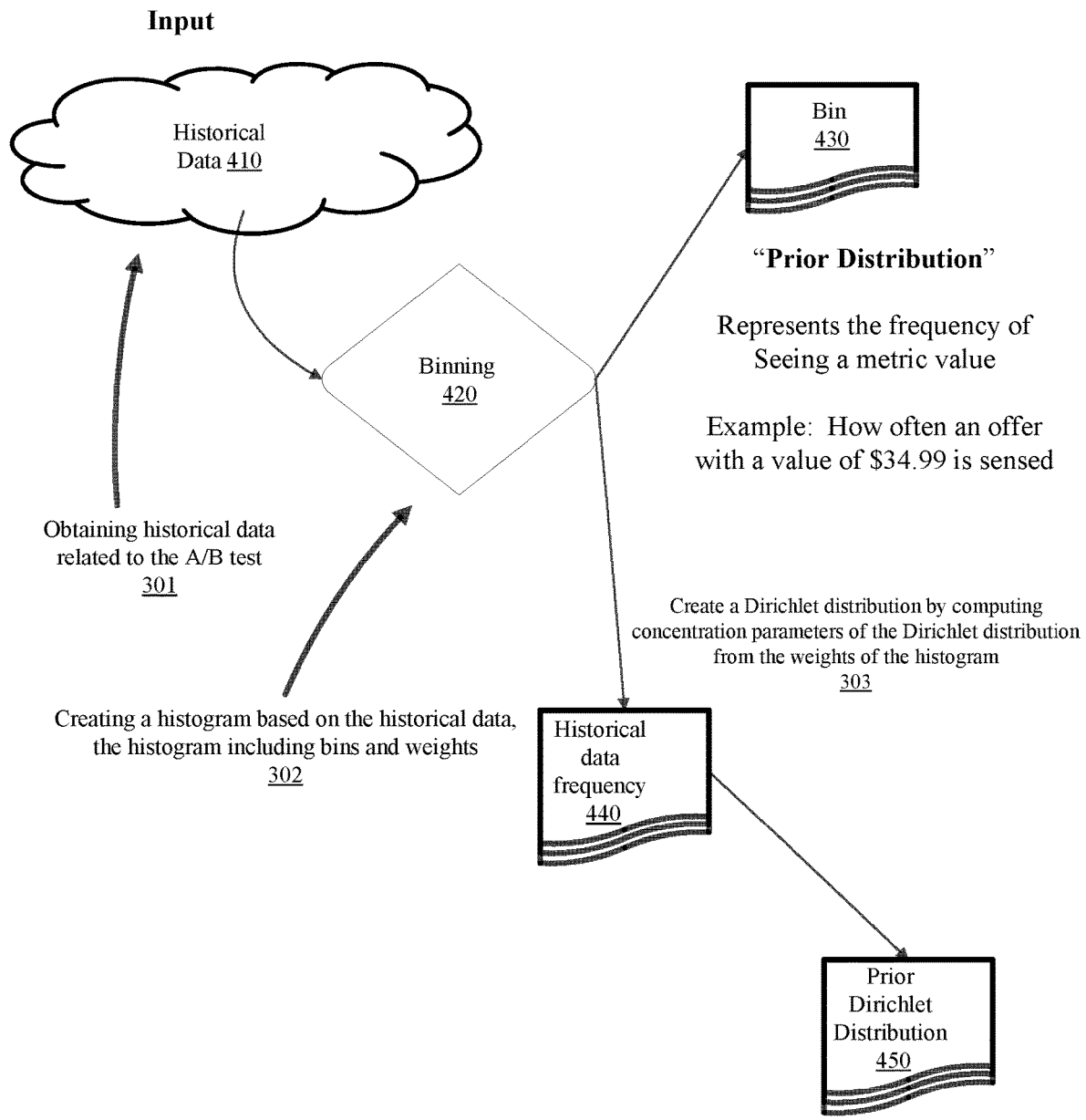
FIG. 4 shows the creation of a Dirichlet distribution based on a histogram that was generated using historical data, according to an embodiment.

FIG. 4 shows the creation of a Dirichlet distribution based on a histogram that was generated using historical data, according to an embodiment. Historical data 410 related to A/B testing is stored and retrieved from prior interactions with users (customers). The data includes any historical data related to the data to be collected and received during the A/B testing.

For an embodiment, Binning 420 includes the creation of a histogram based on the historical data, the histogram including bins and weights of step 302.

A prior distribution that represents a frequency of seeing a metric value (such as, how often an offer with a value of $34.99 is sensed) is created from the binning 420. For an embodiment, the prior distribution which may be a Dirichlet distribution from the weights of the histogram includes a bin (start, end) 430 and historical data frequency 440. For an embodiment, the historical data frequency 440 is used to create the concentration parameters of the Dirichlet distribution. For an embodiment, the bins are transformed into concentration parameters. As previously described, for an embodiment, the concentration parameters are computed by multiplying the histogram weights by a scaling factor. For an embodiment, the scaling factor is a number that is selected to ensure that a desired level of uncertainty is achieved by the distribution. For an embodiment, there is a one-to-one relationship between the concentration parameters of the Dirichlet distribution and the histogram weights, so the distribution is entirely specified by the scaled weights. As previously described, the prior Dirichlet distribution 450 is computed by updating the Dirichlet distribution using the same bins and the new data bin counts and the concentration parameters of the Dirichlet distribution in closed form vie conjugate prior formulae.

Figure 5:
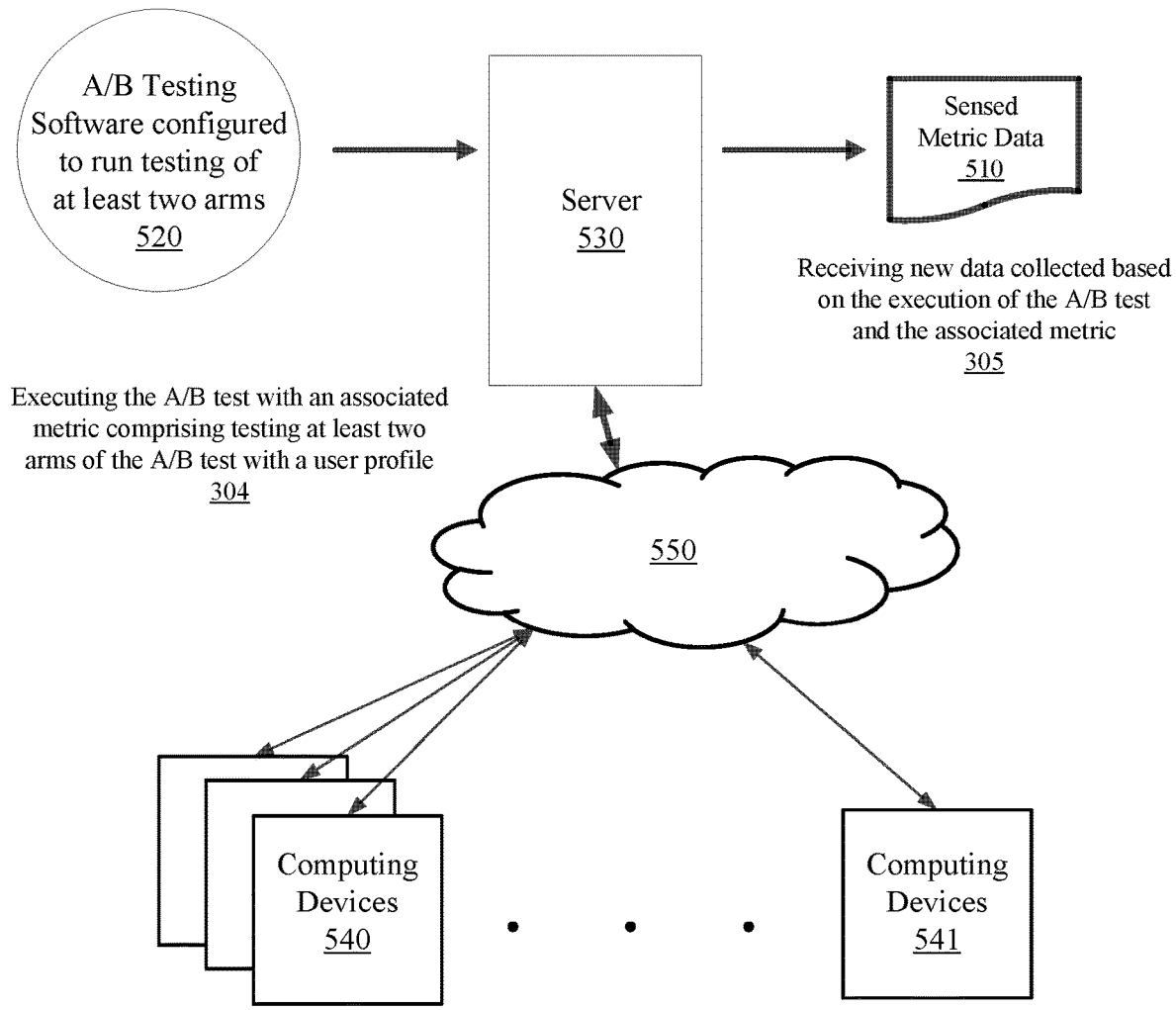
FIG. 5 shows collecting of new data based on A/B testing with an associated metric for at least two arms of the A/B test, according to an embodiment.

FIG. 5 shows collecting of new data based on A/B testing with an associated metric for at least two arms of the A/B test, according to an embodiment. For an embodiment, A/B testing software 520 configured to run testing of at least two arms operates on a server 530 to generate sensed metric data 510. The sensed metric data 510 is collected from A/B testing of user actions of computing devices 540-541 that are network 550 connected to the server 530. As previously described, the sensed customer actions can include any action performed by the customer (recipient) due to the customer (recipient) having received the electronic communication of the A/B test. The sensed customer actions can include sensing physical actions of the customer, such as, actions sensed by electronic sensor(s) located on a computing device of the customer (recipient). Such sensors (global positioning systems, accelerometers, gyroscopes, accelerometers, etc.) can sense physical motion of the customer (recipient) resulting to the customer (recipient) having received the electronic communication. The sensed physical motion can be used to detect a customer visiting a physical location of a merchant and actions of the customer within the physical location of the merchant, such as, physically touching, holding, or moving a product of the merchant at the location of the merchant. For at least some embodiments, the sensed customer actions are digital actions, such as, navigating to a website, spending time or money on an application. For at least some embodiments, the sensed customer actions include a combination of both physical motions/actions by the electronic message recipient (customer) and digital actions by the electronic message recipient (customer).

Figure 6:
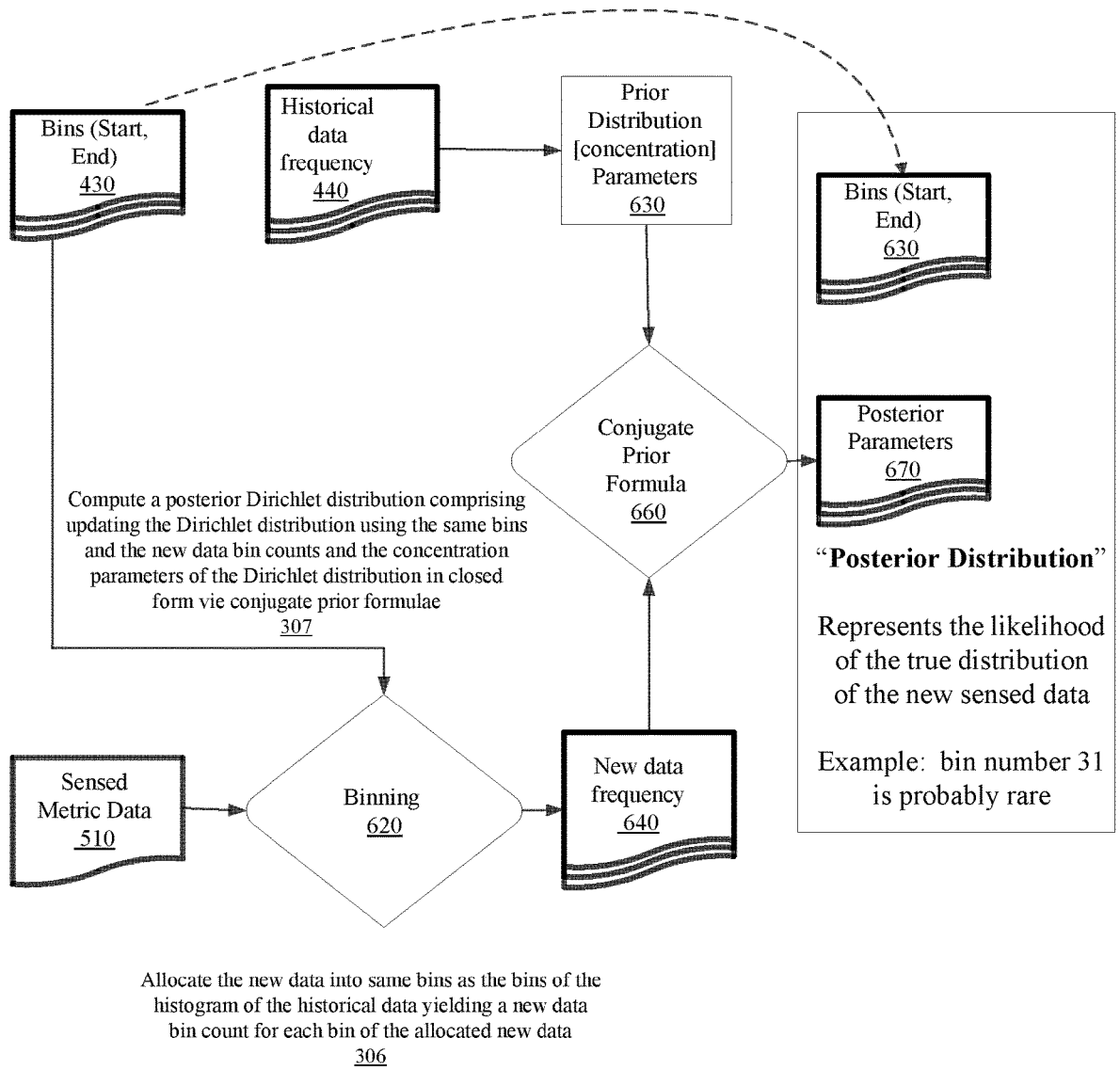
FIG. 6 shows computation of a posterior Dirichlet distribution based on the Dirichlet distribution and the collected new data, according to an embodiment.

FIG. 6 shows computation of a posterior Dirichlet distribution based on the Dirichlet distribution and the collected new data, according to an embodiment. For an embodiment, binning 620 of the sensed metric data 510 includes the allocating of the new data into the same bins as the bins of the historical data of step 306. New data frequency 640 is generated from the binning 620. For an embodiment, the historical data bins (Start, End) 430 are the bins into which the new data (Sensed Metric Data) 510 is allocated.

The historical data frequency 440 is first transformed (as previously described) into Dirichlet distribution concentration parameters 630 (for example, by multiplying by some scaling factor to achieve the appropriate level of uncertainty). Then, a conjugate prior formula 660 is applied to the concentration parameters 630 and the new data frequency 640. For an embodiment, the conjugate prior formulae 660 includes the step 307 of computing a posterior Dirichlet distribution comprising updating the Dirichlet distribution using the same bins and the weights in closed form via conjugate prior formulae. For an embodiment, the posterior distribution includes posterior parameters 670, and the bins (start, end) 630. The posterior distribution represents the likelihood of the true distribution of the newly sensed data. For example, the posterior distribution may include an indication that bin 31 is rare. As an example, if the metric is a purchase value; if the concentration parameter of the posterior Dirichlet distribution corresponding to bin 31 (for example, this bin is $400-$410) is smaller than for other bins, this indicates that few purchases are expected to have value between $400 and $410.

Figure 7:
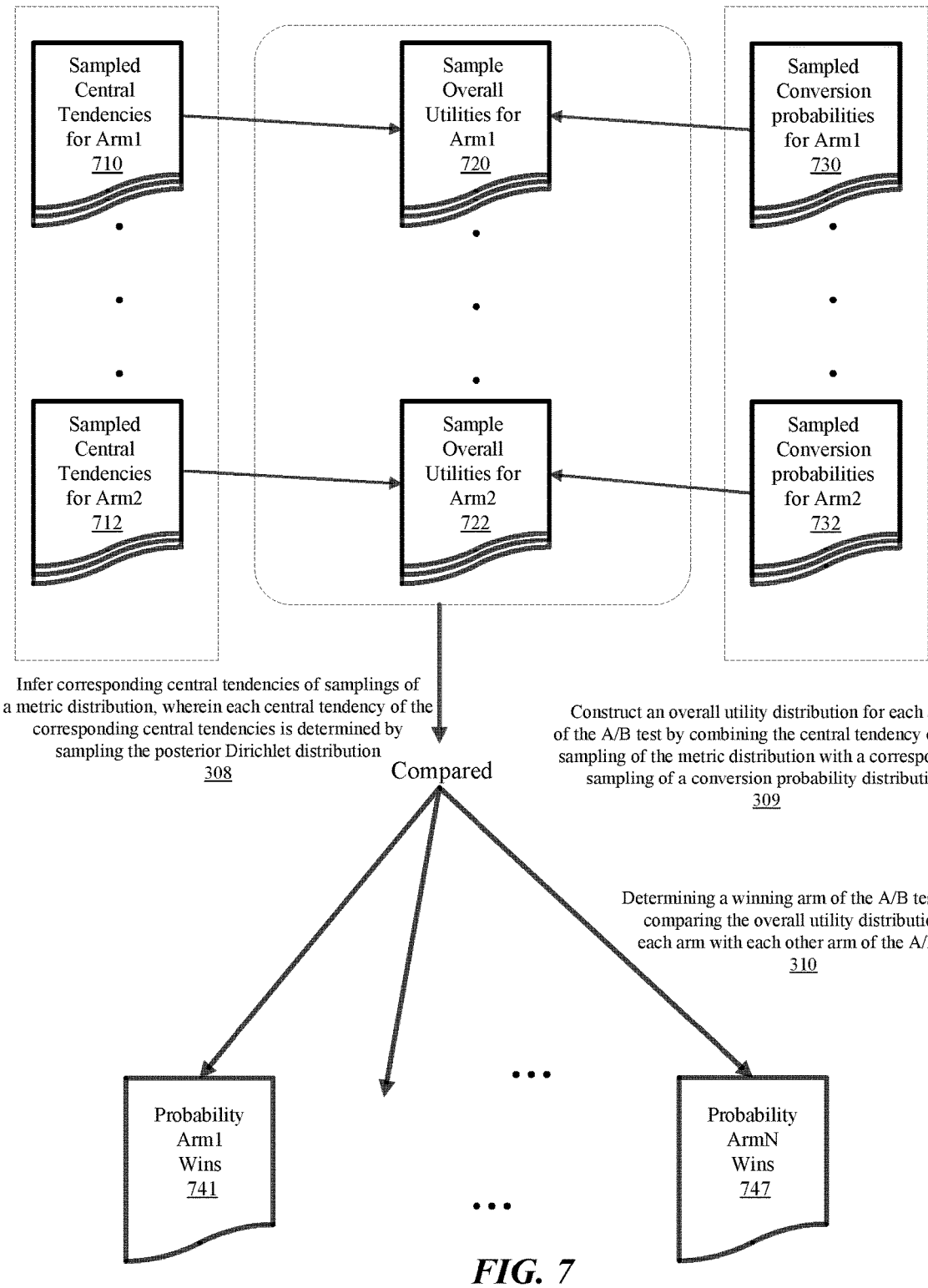
FIG. 7 shows determination of a winning arm of the A/B testing by comparing the overall utility distribution of each arm with each other arm of the A/B test, according to an embodiment.

FIG. 7 shows determination of a winning arm of the A/B testing by comparing the overall utility distribution of each arm with each other arm of the A/B test, according to an embodiment. Sampled central tendencies 710, 712 for different arms (such as, arm1 and arm2), and sampled conversion probabilities 730, 732 for the different arms (such as, arm1 and arm2) are used to generate sample overall utilities 720, 722 of the different arms. For an embodiment, the sample overall utilities 720, 722 represent the previously described overall utility distribution. The "distribution" may be described as "samples" rather than "distribution" because the distribution itself, may not be known, but rather samples from the distribution may be known. The terms "distribution" and "samples" may be used interchangeably because with enough samples, the distribution can be estimated.

Comparison of each of the sample overall utilities 720, 722 of the different arms generates the probability 741, 747 that each of the arms is the winning arm. For an embodiment, for each set of samples comprising one overall utility sample for each arm, the arm having the highest sample overall utility can be said to be the "winner". It is to be understood, that for another embodiment, the lowest sample overall utility is 'better' as in the ecigarette example previously described. For an embodiment, when this is done many times (for each set of samples), the fraction of the times that Arm1 was the "winner" is an estimate of the probability that Arm1 wins. It is to be understood that the previously used term "overall utility distribution" may be used interchangeably with the term "overall utility samples".

As previously described, for an embodiment, the overall utility distribution of each arm is compared with each other arm. However, as described, for an embodiment, the samples of overall utility are used to answer a desired question. For example, the desired question may be whether the probability that Arm1 is better than Arm 2 and so on. Another possible desired question is whether the probability that Arm1 is better than Arm 2 by some significant amount. For example, what is the probability that a new message generates 5% higher revenue than my old message.

Figure 8:
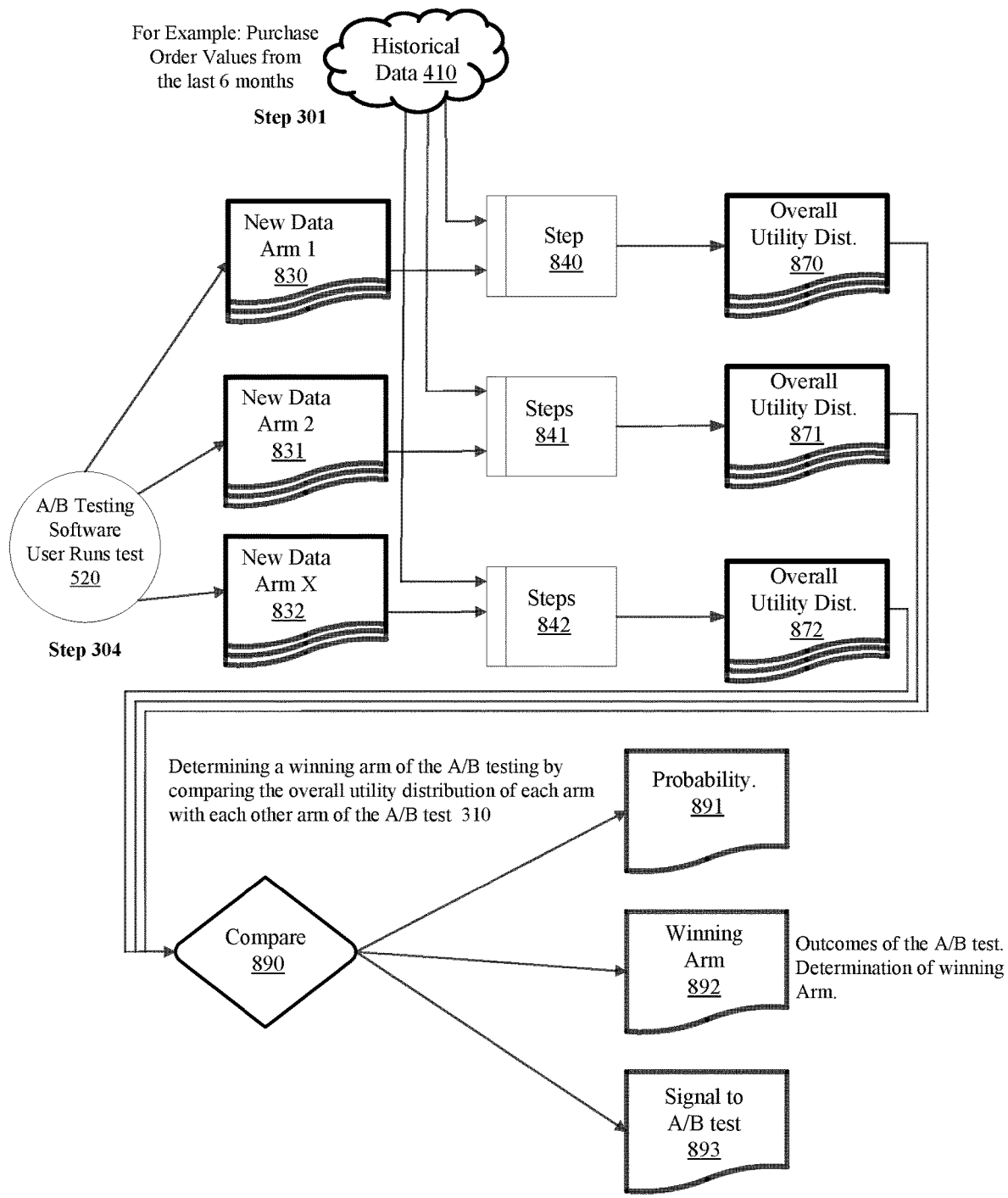
FIG. 8 is a flow chart that includes steps of a method for determining winning arms of electronic testing, according to an embodiment.

FIG. 8 is a flow chart that includes steps of a method for determining winning arms of electronic testing, according to an embodiment. As previously described, for an embodiment, A/B testing software 520 configured to run testing of at least two arms operates on to generate sensed metric data as new data of Arm 1 830, Arm 2 831, Arm X 832. As previously described, historical data 410 related to A/B testing is stored and retrieved from prior interactions with users (customers). The data includes any historical data related to the data to be collected and received during the A/B testing.

For an embodiment, the steps 840, 841, 842 include the steps 301-309 for each of the arms Arm1, Arm2, . . . , ArmX. For an embodiment, overall utility distributions 870, 871, 872 represent the outputs of step 309 for each of the arms Arm1, Arm2, . . . , ArmX.

Compare 890 includes comparing the overall utility distributions 870, 871, 872 to determine a probability 891, a Winning Arm 892, and a Signal to A/B test 893. For at least some embodiments, the overall utility distributions 870, 871, 872 can be compared 890 in different ways to identify things or information. An embodiment includes deciding which arm the user (merchant) should use going forward (that is, for example, the template the merchant should use for future electronic communications). For an embodiment, this includes determining which arm is the likeliest to have the highest utility (this can be referred to as the 'winning arm'). For an embodiment, this includes reference to a concrete outcome (that is, "Arm A looks the best right now, so use Arm A going forward. An embodiment includes referring to the probability of winning that includes a theoretical, unknown outcome that is attempted to be guessed correctly. Accordingly, an embodiment includes comparing the samples and computing the empirical probability 891 of each arm having higher sampled overall utility than the other arms.

At least some embodiments include knowing not just what the best arm is, but whether any arm is better than the others by some fixed amount. It is to be understood that for this embodiment, there may not be a "winner" if none of the arms are better than the other arms by that fixed amount. Accordingly, the "best" arm may not be the "winner". For an embodiment, arms that differ by less than this fixed amount are said to be within the "region of practical equivalence" (ROPE) in Bayesian statistics literature. Note that this outcome is not explicitly represented currently in FIG. 8. For an embodiment, the "fixed amount" is a number that represents a practical significance that the experimenter can choose. For an embodiment, the fixed amount is adaptive based on historical data or business outcomes the experimenter is trying to drive. As described, the winning arm 892 may be the best arm or the winning arm may be the arm that is the fixed amount better than the other arms.

An embodiment includes automation of the A/B test process using the comparing 890 of the overall utility distributions 870, 871, 872. An embodiment includes deriving from the overall utility distributions a measure of confidence an arm is truly the best arm. For an embodiment, this confidence is then used to send a signal 893 to an outer monitoring process (whose responsibility is managing the experiment at a high level) to adjust the parameters of the A/B testing. One common such signal is simply a signal to stop (or continue) the A/B testing. Another common signal indicates that the distribution of test recipient changes. This process can be referred to as Thompson sampling.

Although specific embodiments have been described and illustrated, the embodiments are not to be limited to the specific forms or arrangements of parts so described and illustrated. The described embodiments are to only be limited by the claims.

What is claimed:

1. A system configured to select a winner of an A/B test, comprising:
    a plurality of computing devices;
    a merchant server;
    a server, the server connected to the merchant server and the computing devices through a network, the server configured to:
    obtain historical data related to the A/B test of a merchant of the merchant server;
    create a histogram based on the historical data, the histogram including bins and weights;
    create a Dirichlet distribution by computing concentration parameters of the Dirichlet distribution from the weights of the histogram;
    execute the A/B test with an associated metric comprising testing at least two arms of the A/B test with a user profile;
    receive new data from the plurality of computing devices collected based on recipient actions during the execution of the A/B test and the associated metric;
    allocate the new data into same bins as the bins of the histogram of the historical data yielding a new data bin count for each bin of the allocated new data;
    compute a posterior Dirichlet distribution comprising updating the Dirichlet distribution using the same bins and the new data bin counts and the concentration parameters of the Dirichlet distribution in closed form vie conjugate prior formulae;
    infer corresponding central tendencies of samplings of a metric distribution, wherein each central tendency of the corresponding central tendencies is determined by sampling the posterior Dirichlet distribution;
    construct an overall utility distribution for each arms of the A/B test by combining the central tendency of each sampling of the metric distribution with a corresponding sampling of a conversion probability distribution;
    determine a winning arm of the A/B testing by comparing the overall utility distribution of each arm with each other arm of the A/B test; and
    electronically communicate with recipients of the computing devices using a template based on the winning arm of the A/B testing.

2. A method for selecting a winner of an A/B test, comprising:
    obtaining historical data related to the A/B test;
    creating a histogram based on the historical data, the histogram including bins and weights;
    creating a Dirichlet distribution by computing concentration parameters of the Dirichlet distribution from the weights of the histogram;
    executing the A/B test with an associated metric of the A/B test with a user profile;

receiving new data collected based on the execution of the A/B test and the associated metric;

allocating the new data into same bins as the bins of the histogram of the historical data yielding a new data bin count for each bin of the allocated new data;

computing a posterior Dirichlet distribution comprising updating the Dirichlet distribution using the same bins and the new data bin counts of each bin and the concentration parameters of the Dirichlet distribution in closed form vie conjugate prior formulae;

inferring corresponding central tendencies of samplings of a metric distribution, wherein each central tendency of the corresponding central tendencies is determined by sampling the posterior Dirichlet distribution;

constructing an overall utility distribution for each arm of the A/B test by combining the central tendency of each sampling of the metric distribution with a corresponding sampling of a conversion probability distribution; and determining a winning arm of the A/B testing by comparing the overall utility distribution of each arm with each other arm of the A/B test.

3. The method of claim 2, further comprising electronically communicating with A/B testing recipients using a template of the winning arm of the A/B testing.

4. The method of claim 2, wherein each central tendency is determined for each sample of sampling of the posterior Dirichlet distribution.

5. The method of claim 2, wherein the winning arm is an arm that most frequently has a highest sampled utility when sampling the overall utility distribution of the arm.

6. The method of claim 2, wherein the A/B test comprises testing of at least one of websites, forms, templates of emails, or templates of mobile messages.

7. The method of claim 2, wherein each arm of the A/B testing includes a template of at least one of a form, an email, or a mobile message, including an A template and a B template, wherein each template includes a set of data objects that combine to represent a structure of the form, the email, or the mobile message, wherein the A template and the B template of the form, the email, or the mobile message each have a different content, behavior, or send time.

8. The method of claim 7, wherein the different behavior includes the form, the email, or the mobile message popping up being loaded or sliding out from a side of a display of a recipient after being loaded.

9. The method of claim 7, further comprising selecting the winning arm as a user default, wherein the selected user default is used for electronic communications with recipients.

10. The method of claim 2, wherein the associated metric includes at least one of revenue per message, a purchase value, a quantity of items purchased, a number of times software users open an application, an amount of time users spends in an application.

11. The method of claim 2, further comprising selecting weighting of distribution of recipients receiving each of the arms based on the overall utility distribution for each of the arms of the A/B test.

12. The method of claim 11, wherein the weighting of distribution of each arm is based on how frequently the arm was a highest sampled utility when sampling the overall utility distribution of the arm.

13. The method of claim 2, further comprising ending the A/B test based on the overall utility distribution for each of the arms of the A/B test.

14. The method of claim 2, wherein the A/B testing is ended when the overall utility distribution of one arm is a threshold better than each of other arms.

15. The method of claim 2, wherein inferring corresponding central tendencies of samplings of a metric distribution comprises:

sampling the posterior Dirichlet distribution to create values for each bin; and computing a sample mean for each bin comprising summing a center point of endpoints of each bin multiplied by a corresponding created value of the bin.

16. The method of claim 15, wherein the sampling of the posterior Dirichlet distribution to create values for each bin provides a prediction of how frequently the bin occurs in an actual distribution of the new data.

17. The method of claim 2, wherein receiving the new data collected based on the execution of the A/B test and the associated metric comprises sensing actions of recipients of electronic communications of the A/B test.

18. The method of claim 17, wherein sensing actions of the recipients includes sensing physical motion of the recipients including sensing keyboards actions of the recipients, sensing physical motion of the recipients, and tracking locations of the recipients.

19. The method of claim 2, wherein obtaining historical data related to the A/B test includes sensing of past actions of recipients related to the A/B test, wherein receiving new data collected based on the execution of the A/B test and the associated metric comprises sensing actions of recipients electronically receiving electronic communications of the A/B test, and further comprising influencing future electronic communications with recipients based on the winning arm of the A/B test.

20. The method of claim 19, wherein sensing actions of the recipients comprises sensing, by sensors of computing devices of the recipients, changes in physical location and motion of the recipient that are correlated with receiving the electronic communications, and wherein influencing future electronic communications with the recipient comprises selecting a winning template associated with the winning arm of the A/B test, wherein the winning template is used for future electronic communications with the recipients.

\* \* \* \* \*